March 16, 1937. E. BENEDEK 2,074,205
FLUID PRESSURE GENERATOR
Filed July 24, 1933 4 Sheets-Sheet 1
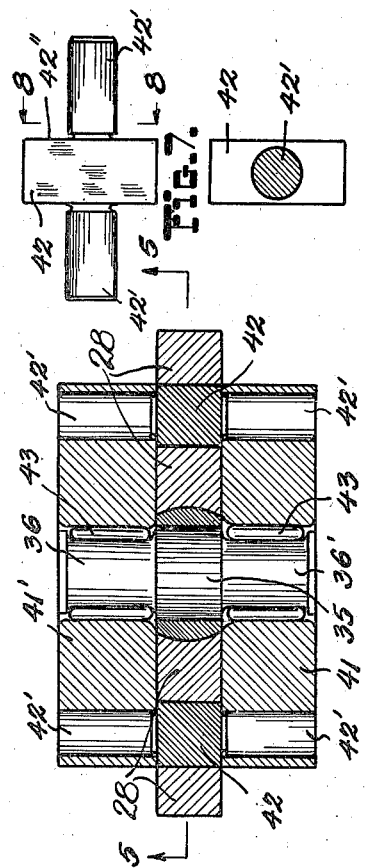
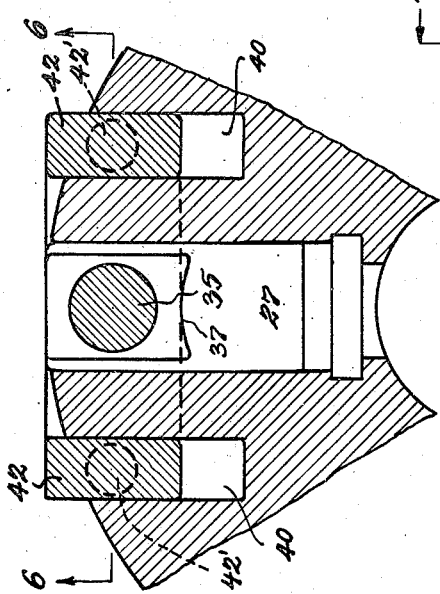
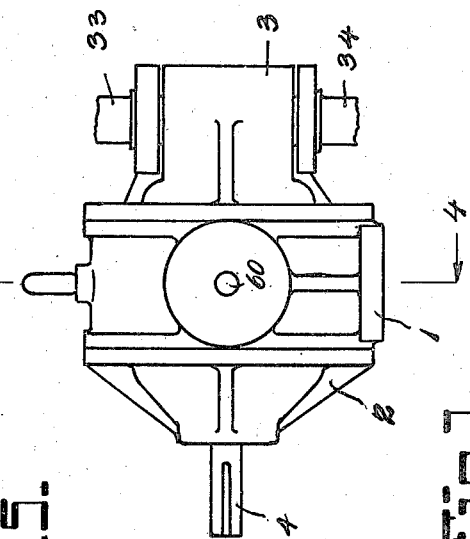
Inventor
ELEK BENEDEK
By Robb & Robb
Attorneys

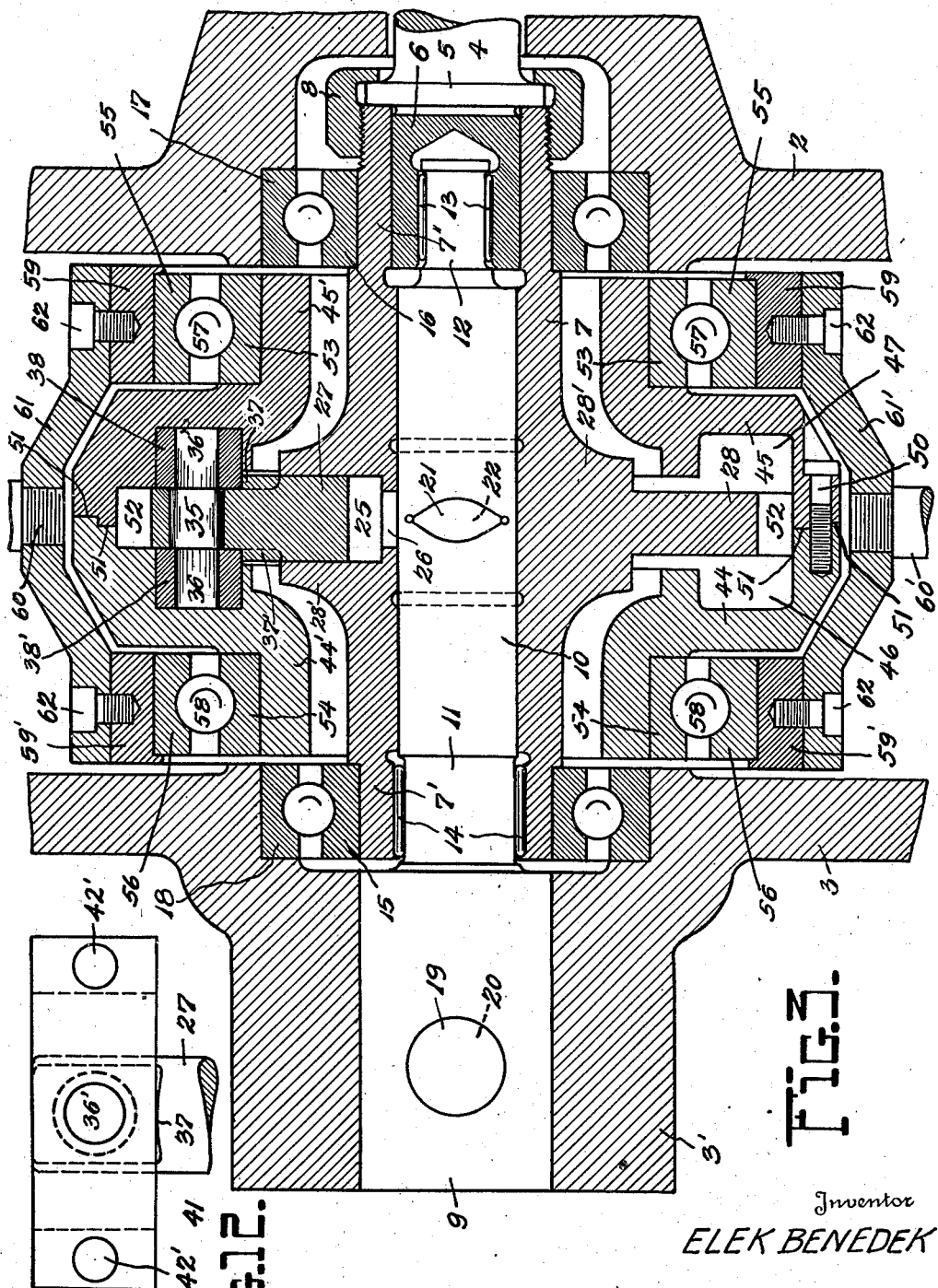

March 16, 1937.  E. BENEDEK  2,074,205
FLUID PRESSURE GENERATOR
Filed July 24, 1933   4 Sheets-Sheet 3
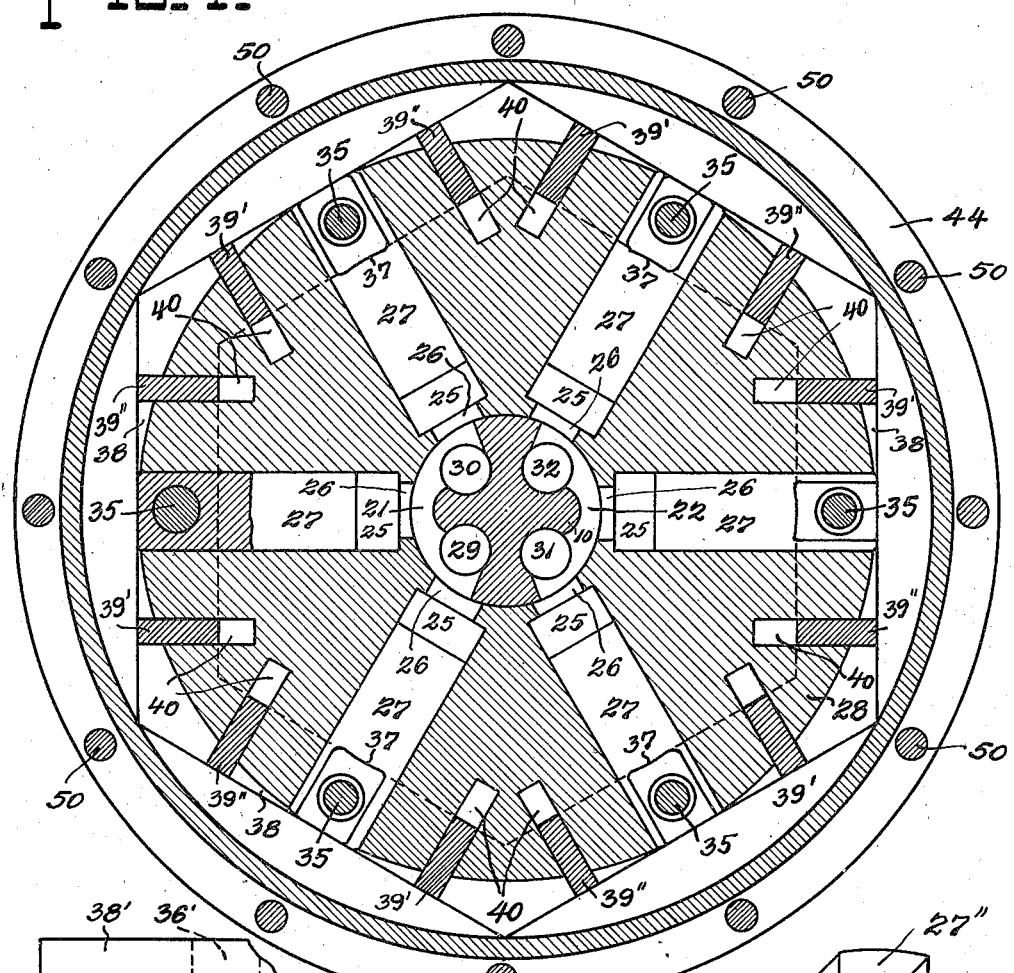
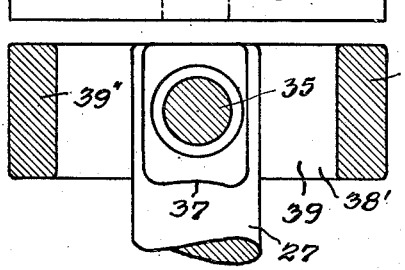
Inventor
ELEK BENEDEK.
By Robb & Robb
Attorneys March 16, 1937. E. BENEDEK 2,074,205
FLUID PRESSURE GENERATOR
Filed July 24, 1933 4 Sheets-Sheet 4

Inventor
ELEK BENEDEK.

By Robb & Robb
Attorneys

Patented Mar. 16, 1937

2,074,205

UNITED STATES PATENT OFFICE 2,074,205

FLUID PRESSURE GENERATOR

Elek Benedek, Mount Gilead, Ohio

Application July 24, 1933, Serial No. 681,991

13 Claims. (Cl. 103—161)

This invention relates to pumps and motors of the variable stroke and rotary multi-piston type for the purpose of fluid pressure transmission systems. Pumps and motors of the type referred to are today unreliable for commercial applications because their output and capacity are limited to small sizes of machines, and in addition to that they are too noisy under the operating pressure cycle.

The term "fluid pressure generator" is herein used for the purpose of clearness, in order to distinguish this invention from the conventional class of pumps in which the high pressure and variable positive discharge feature is not an absolute prerequisite of the usefulness of the device. With the imperative demand of nature's laws of economy, particularly in regard to the usefulness of a modern machine, it is a primary prerequisite to build the machine so that in a certain size a maximum amount of power will be obtainable, or the machine be susceptible of a maximum flow of input energy or power. To do this, fluid pressure generators have to operate first at high speed, and second at high pressure and thus turn out a maximum possible power from the unit. This being an absolute requirement for the usefulness of this type of generators or hydraulic power machines, I find it necessary to use this new term instead of or descriptive of the term "pump", which as commonly accepted now designates a hydraulic machine which sucks and delivers fluid, practically speaking, at highly difficult pressures. Therefore, the main requirement as to the operativeness of such machines, is: Good suction. On the contrary, a pressure fluid generator is absolutely useless and inoperative in the present day sense if it is unable to maintain commercial pressure such as 250 atmospheres or the like. In other words, a 10 inch diameter ram of a hydro-power press has to furnish approximately 1200 tons, and if a pump is not able to create that tonnage and maintain that tonnage for a determined length of time, it will not be useful and commercial for that press and therefore will not be used as a generator for that press system.

The main purpose of this invention is to alleviate the above difficulties, limitations upon utility, increase their useful life and reliability, eliminate the pressure noises incident to their operation, and provide a commercial unit which will operate silently without pressure vibration, and one that can be safely built for units developing unlimited outputs. Pumps of this art ordinarily are comprised of a driving and a driven member respectively, and a plurality of piston units which couple the driving with the driven units. In larger units under present conditions the driving torque imposed upon the piston units creates mechanical stresses in the pistons and coacting cylinders which results in sudden wear of these hydraulic members and in accompanying slippage and in firing of the working fluid medium. The firing of the working fluid medium means the burning up and oxidation of the oil during operation of the pumps. The firing of the working fluid is caused by undue friction of the piston within the cylinder due to excessive sliding friction therebetween, due to the great transverse force imposed upon the cooperating sliding surfaces by the torque to be transmitted. The excessive surface pressure creates "hot spots" on certain surface areas of the piston and cylinder barrel, which "hot spots" will burn up the operating fluid. When the piston becomes too hot and burns up the thin oil film surrounding the same, and the destruction of the oil film causes further and sudden increase of friction which further increases the temperature of the overheated piston, until the entire working fluid begins to "smoke" and evaporate. When the working medium, say oil, in the present machine gets hot and thin, the driving torque imposed on the pistons will squeeze out the thin oil from the hydraulic joints and surfaces and an accelerated friction and wear, and subequent seizure and burning of the piston surfaces, result in the wrecking of the whole unit.

To avoid these weak points of present commercial design, I have devised a generator in which the driving and driven, or primary, and secondary pump members, are coupled by means of the crossheads in such a manner that the pistons are entirely relieved from torque transmission and thus they are likewise relieved from bending stresses. It will be seen that if the pistons and crosshead pins of my construction are removed or omitted, the primary member will positively drive the secondary member through the crossheads themselves, thereby entirely relieving the pistons from mechanical work, leaving for the pistons only the hydraulic work, which is the radial compression of the working fluid, which work imposes axial compressing stresses on each piston plunger only. Thus, each piston is working in a radially floating manner, without transverse driving strain and friction thereon, according to my present invention.

It will be noted that due to the novel structural arrangement of my pivotally floating crosshead units with respect to their piston units and piston actuating reactance member respectively, the floating crossheads will transmit the driving torque of one rotor to the other in a uniformly distributed manner, i. e. each crosshead coupling element will take a definite portion of the torque to be transmitted, thus the total driving torque will be evenly distributed in equally spaced coacting points of the primary and secondary rotors respectively. Furthermore it also will be seen that all my novel combined crosshead and coupling elements are not only peripherially and evenly distributed between the said primary and secondary rotors, but also they are disposed in the central plane of the pistons and cylinders in such a manner, that the driving or torque transmitting coaction between said rotors also will be in the central plane of the pistons and cylinders, which plane is also the central plane of said rotors with respect to their supporting bearing members, with the subsequent advantage of a so called balanced torque transmission or driving, since no torsional oscillation or transverse distortion will be caused by said torque transmission.

Another main object of my invention is to relieve the double end supported crosshead pin of my construction of the pressure of the piston and transmit the piston pressure to the crosshead slides directly through a pair of working shoulders on the pistons, thus to eliminate the wear on the pin. Furthermore, I do away with the elastic vibration of the pin under the periodic pressure impulses of the pistons, which vibrations are directly transmitted to the working fluid under the pistons, and thus create a periodic expansion and compression of the working fluid, which at commercial speeds, 900–1800 R. P. M., creates loud pressure noises in the hydraulic system, say in a hydro-powered press or the like.

The direct thrust load transmission from the piston shoulders to the slides alleviates this trouble.

Although my piston pin 35 provides for floating or pivotal connection between the piston and its associated coupling crosshead element 38, 38', it will be understood that there is no finite rocking movement therebetween, but only minute adjustment to compensate for the misalignment of the coupling crosshead elements simultaneously in the cylinder grooves 40 and in the tangential groove ways 46 of Fig. 13 respectively. As soon as this misalignment, due to error in machining is taken up by the pivot point 35, and by the coacting bearing bore of the slide, all rocking is over, thus the relative movement or rocking between pivot pin 35 and slide 38, 38', may be termed as very minute or infinitesimal.

But the pressure of the piston does not only react on tiny pins of the slides in present commercial pumps of this art, but the enormous piston pressure up to 500 atmospheres per square inch creates an equivalent inwardly acting force, which reacts against a central cylindrical valve known as the "pintle" in the American art. This pintle in the pumps of the prior art is an overhanging long member, supported in the manner of a cantilever beam. This cantilever pintle is also supported along the rotating cylinder barrel. However, it is free to flex under the periodic pressure of the resultant piston load according to the laws of elastic deflections and vibrations. The elastic vibrations and excessive friction created between barrel and pintle combine with the similar action of the crosshead pin as above described and create a characteristic radial pump noise, under pressure as well known to those familiar with this art.

To minimize the danger of the rubbing mechanical contact between pintle and barrel and aforesaid periodic vibrations of the pintle created by the periodic piston loads, I provide an end support for said pintle for the end which is opposite to the walled-in end on a novel type bearing.

For the purpose of pointing out the creation of the new result involved in this new valve supporting arrangement, I call attention to the fact that with a cantilever beam, and such a beam with an end support, under similar load conditions, according to the data of mechanics, the unsupported end of the beam will have a deflection which is about 67 times as great as the deflection of the end supported beam under the same uniformly distributed load. Thus with my novel structure I can maintain 67 times less clearance in wear for the same piston load as pumps of the prior art.

In order to further limit hydraulic clearance and mechanical wear between the pintle and barrel for the purpose of high hydraulic efficiency I further provide a pilot bearing between pintle and cylinder barrel at the walled-in end of the pintle, to thereby eliminate the effect of eccentric mountings of the main cylinder bearings and their wear and initial looseness, to thereby ensure positive bearing means besides the oil film, between barrel and pintle.

Other main purposes of the invention will be apparent from the accompanying drawings, which form a part of this specification.

In the accompanying drawings:—

Figure 1 is a side view of the pump constructed according to my invention.

Figure 2 is an end view of the pump embodying this invention.

Figure 3 is a longitudinal section of the pump shown in Figures 1 and 2, taken on line 3—3 of Figure 2.

Figure 4 is a transverse section of the pump shown in Figures 1 and 2, taken on line 4—4 of Figure 1.

Figure 5 is a partial transverse section of the pump, taken on line 5—5 of Figure 6, showing a variation of the detail disposition of the novel piston and its crosshead parts and slides, respectively.

Figure 6 is a sectional view of my novel crosshead piston and cylinder block, taken on line 6—6, in Fig. 5.

Figure 7 is a coupling element in plan view, showing an individual coupling which is adapted to engage the cylinder barrel and piston actuating member for driving relation.

Figure 8 is a side view and partial section of the coupling element in Figure 7, taken on line 8—8 of Figure 7.

Figure 9 shows the piston and its associated assemblies as shown in Figure 4 for the purpose of clearness.

Figure 10 is a top view of the piston and its associated assembly shown in Figure 9.

Figure 11 is a perspective view of my novel piston head showing the eye of the head, and more particularly the right and left shoulders of the pistons to transmit the hydraulic piston load to the associated slides directly without application thereof to the crosshead pin.

Figure 12 is the side elevation of my novel piston and its associated assembly according to the modification shown in Figures 5 and 6.

Figure 13:
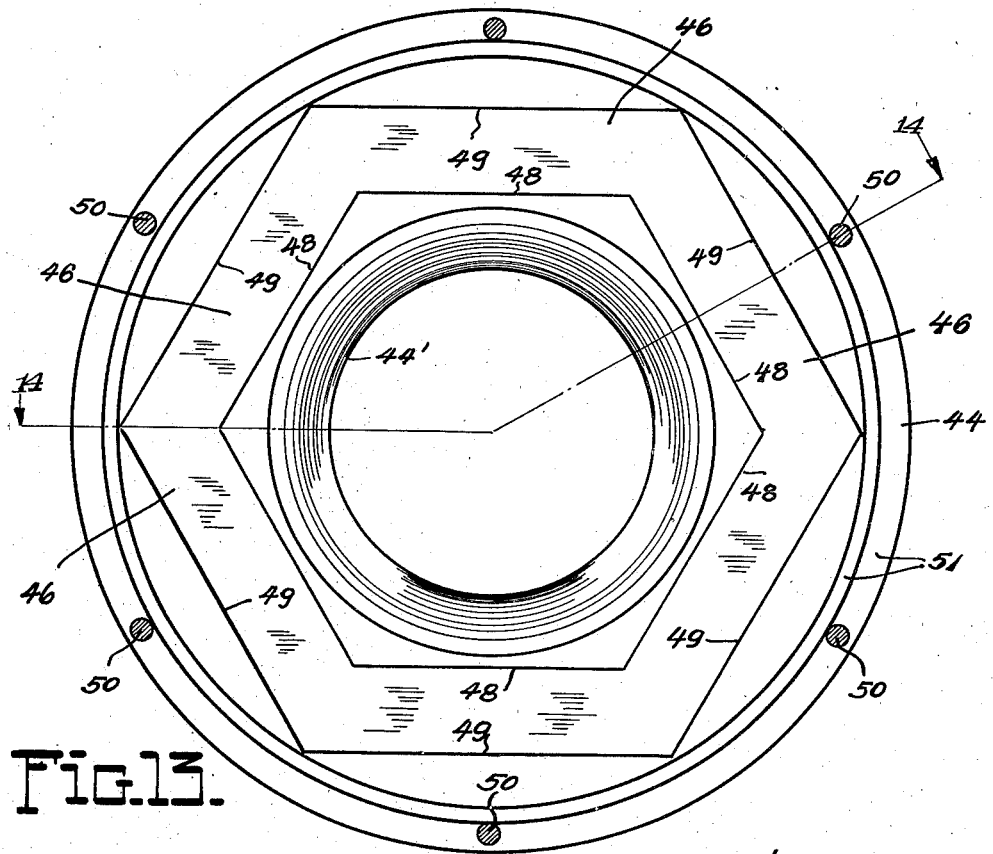
Figure 13 is a transverse sectional view of my novel piston actuating rotary member taken through the split meridian plane 13—13 of said eccentric in Figure 14.

For the sake of simplicity the illustrations show a hydraulic generator or pump with an even number of pistons, which, however, may be constructed with any other number of pistons as hereinafter will be specifically described.

Referring to Figures 1 and 2, the pump selected for the illustration of the invention comprises a liquid-tight casing comprising a body 1, shaft-end cover 2, and main covering head 3.

According to Figure 3, a drive shaft 4 having an annular shoulder 5 and hollow end portion 6 is rigidly secured by a conventional key connection, not shown in the drawings, to one of the supported ends of cylinder barrel or primary driving member 7, which end is pulled tightly against shoulder 5 of drive shaft 4 by the lock nut 8. Cylinder barrel 7 is supported at both ends on the inner ring of conventional anti-friction bearings 15 and 16 respectively. The outer races 18 and 17 respectively of said bearings, are mounted in covers or heads 2 and 3 as shown in Figure 3. The pintle 10 is stationarily held through its enlarged portion 9 in the hub portion 3' of main head cover 3, by being pressed into said hub portion 3' and in addition, by means of a conventional key connection, not shown in the drawings.

The central portion of pintle 10 is adapted to distribute the working fluid and sustain the inwardly acting hydraulic pressure. To provide for this and minimize all possible friction, deflection and periodic vibrations of the pintle 10, its ends on both sides of its suction and pressure ports 21 and 22, respectively, have reduced bearing portions as at 11 and 12, respectively. Bearing portion 11 cooperates with the end portion 7' of the barrel 7 in the zone of bearing race 15, as a pilot anti-friction bearing by means of interposed needle bearings 14. Reduced portion 12 is similarly disposed in the working zone of anti-friction bearing race 16 in such a manner that it projects into the hollow end 6 of the drive shaft 4, which forms the outer bearing race for the needle bearings 13 of this pilot bearing. Thus it is evident that while the cylinder barrel 7 is supported at its two ends in anti-friction bearings 15 and 16 respectively, the central valve or pintle is also indirectly supported on the same bearings through the provision of pilot needle bearings 13 and 14 respectively. The characteristics and function of the bearings 13 and 14 and of the pintle structure and mounting are more fully described and claimed in my copending application Serial No. 754,853, filed November 26, 1934, and entitled "Variable displacement pump and method of balancing hydrostatic load." Thus, pintle 10 does not rely on the support of its enlarged extension 9, as hitherto has been customary, in the manner of a cantilever beam, i. e., on one end only. The other end of the pintle in previous constructions being unsupported, usually drags on the wall of the barrel under considerable danger of seizure and with great wear due to its heavy load deflection. Pintle 10 has its reversible ports 21 and 22 formed in the conventional manner with the exception of their contour which provides a continuous curve of a butterfly. Port 21 is in communication with port 19 through axial channels 29 and 30, which further communicates with main line 33 of the outer circuit (see Figure 2). Ports 22 and 20 similarly communicate through axial passages 31 and 32, and further to the outside oil circuit through connection 34 (see Figure 2). Cylinder barrel 7 outside of its wider disc portion 28' is provided with a narrow outermost disc portion 28. Each cylinder bore 25 thus extends radially from the outside of the narrow rim 28 to the inner cylinder port 26 in a radial direction, to receive the piston 27. Each piston has an opening or eye 27' and an outer end 27" flattened on both sides in a parallel manner (see Figure 11). The piston ends in arcuate shoulders 37 and 37' to engage directly the parallel flanges 38 and 38' of the slide 39. The slide 39 is provided with ends 39' and 39" which are engaged by the slots 40 provided in the narrow disc portion 28 of cylinder barrel 7. Guide slots 40 are parallel with their respective piston bore so that slide 39 through its ends 39' and 39" is thus guided radially and driven tangentially or angularly by the barrel 7. The crosshead pin 35 is engaged by eye or opening 27' of the piston 27 and has lateral extensions, as at 36 and 36' to engage the sides 38 and 38' of the slide 39 and thereby operate the piston during suction stroke only.

The slide 39 as shown in Figures 9 and 10 is rectangular and comprises the slides 38 and 38' interconnected at their ends by said ends 39' and 39", thus forming an open frame. A transverse bore in the sides 38 and 38' is adapted to engage the extensions 36 and 36' of crosspin 35, and thereby the piston 27. Thus it will be seen that the piston has a free rocking mounting on its crosshead pin 35 or its extensions 36 and 36', thereby ensuring free alignment in its respective bore 25 without strain or stress. A slight modification of the slide is shown in Figures 5, 6, 7, 8 and 12, wherein the ends 39' and 39" as previously described are not integral parts of the slide but they are detachable, whereby a more flexible production of the slide is made feasible. According to this modification the sides 41 and 41' have free cylindrical bearing bores for the cross-members 42 as shown in Figure 6, whereby the journal portions 42' of cross-members 42 have free rocking movement. Each member 42 thus has guide shoulders as at 42" in Figure 7 to keep 41 and 41' parallel. This modification is particularly advantageous for large units and therefore the extensions of crosshead pin 35, which is pressed into the piston head, are mounted on anti-friction needle bearings 43. It will be seen that when under heavy hydrostatic pintle load, with great torque on the slide assembly at full load and full volume, the driving force between cylinder barrel extension 28 and piston actuating eccentric parts 44 and 45 tends to rotate or twist the slides about the crosshead pin 35. Under this condition the members 42 can follow freely their reciprocation in their coordinated grooves or slots 40, because any transverse twist of the side parts 41 and 41' will be taken care of by the freely rocking journals 42' of the said members 42.

In order to accommodate freely for this elastic twist of the slides or slide assembly, the shoulders 37 and 37' of the pistons in Figure 11 are formed arcuately (see also Figure 5) affording rocker bearings. Thus each piston under its maximum load will be perfectly free from the driving stresses which will be entirely exerted by the slide assembly itself as coupling member between cylinder barrel 28 and piston actuating eccentric members 44 and 45, forming a secondary driven member or reactance motor. In order to clearly illustrate how the slides 39 or 41—41' are engaged by the eccentric discs 44 and 45, I show in Figures 13 and 14 the eccentric itself. According to these figures the assembly comprises two eccentric discs 44 and 45, which are bolted together by a plurality of cap screws 50 as shown. Each eccentric disc 44 or 45 is provided with a concentrically disposed circular flange portion as at 44' and 45', respectively, affording mountings therefore, as will be set forth later on. The eccentric discs have mating circular faces as at 51 which are slightly staggered to keep their concentricity the same. The eccentric assembly or secondary driven member is provided with circular chamber 52 which will accommodate the flange rim 28 of the cylinder barrel movable therein for the purpose of fluid control. Adjacent and in communication with chamber 52 are a plurality of chordal grooves forming chordal slideways as at 46 and 47 in the eccentric discs, having normally transversely aligned disposition to receive the longitudinal flanges 38, 38' or 41, 41' respectively, as the case may be, of the slide structures or assemblies. Each slideway thus has a load transmitting straight bearing surface 49 and a guide and suction surface 48 to guide the slides during its operation.

Figure 14:
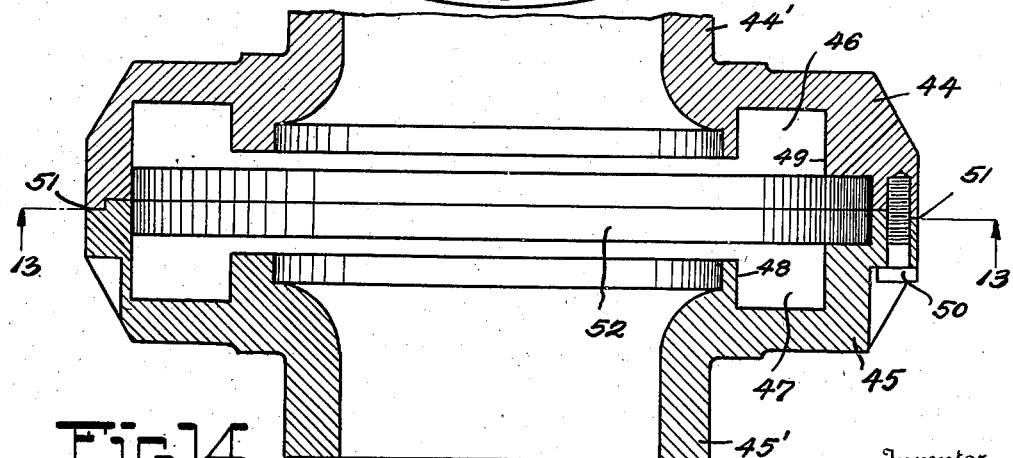
Figure 14 is a longitudinal sectional view of my novel piston actuating rotary member taken through its rotational axis on line 14—14 in Figure 13.

Thus in Figures 13 and 14 we have an axially detachable rigid eccentric or piston actuating member. It is understood that the load transmitting shoulders inside of the eccentric disc members 44 and 45 may be made separably from the disc members and inlayed and fastened inside of said members in a proper manner, or not fastened at all, but kept floatingly in proper relation by the slides as spacers. Eccentric members 44 and 45 are mounted on anti-friction bearings 57 and 58 in a well known manner, by having the inner rings 53 and 54 mounted directly on ring flanges 44' and 45' respectively, and the outer rings 55 and 56 arranged in bearing retainer rings 59 and 59'. Retainer rings 59 and 59' are provided with diametrically opposite parallel bearing sliding surfaces as a resultant crosshead, and are supported in mating parallel bearing surfaces of end covers 2 and 3 respectively as known in the art. Therefore they are not shown separately in the drawings.

Bearing retainers 59 and 59' are shifted by yokes 61 and 61' respectively, they being connected in one rigid assembly by cap screws 62.

Control rods 60 and 60' connect the control means to the yoke assembly and control the stroke during operation according to the nature of the job for which the pump will be used.

The pump will operate in a well known manner. When the cylinder barrel and piston crossheads are in concentric relation, the pistons will stand still in their cylinders and no pumping action will take place. However, when the piston actuating members 44 and 45 are adjusted by suitable control rods and members 60 and 60', to one side or the other of the center of the cylinder barrel or pintle, the pump will deliver through passages 33 or 34 according to the relative position of the primary and secondary rotors.

From the foregoing it will be observed that the assemblage of parts which has been hereinbefore set forth involves the provision, generally speaking, of the primary driving member or piston barrel 7 associated with the secondary driven member consisting of the eccentric or piston actuating unit including the parts 44 and 45, the said primary and secondary members or units equipped with the usual pistons 27 carried by the primary driving member 7, and the secondary driving member or unit having means for the actuation of the pistons in the manner set forth. It is notable that the primary and secondary members or units are coupled by the unique slide structures 42 that form movable guiding and coupling elements intermediate the primary and secondary members functioning in the manner presented to relieve the pistons of all driving torque and consign their action essentially to carrying out their hydraulic functions.

Having thus described my invention, what I claim as new and desire to secure by Letters Patent of the United States, is—

1. In a hydraulic machine of the class described, in combination, a casing, a primary driving member comprising a cylinder barrel, a secondary driven member comprising a piston actuating member, pistons carried by the primary driving member and operable by said secondary member, and movable coupling members intermediate the cylinder barrel and piston actuating member, the same comprising slides embodying spaced parallel ends and spaced parallel sides, the piston actuating member having slideways for the sides of said slides and the cylinder barrel being formed with guideways to receive the ends of said slides each side of said slides being provided with a pair of radially aligned parallel plain bearing surfaces for free sliding reciprocation in the slideways of said slide, and each end of said slides being provided with a pair of parallel plain bearing surfaces for free sliding reciprocation in the guideways of said cylinder barrel, said ends being disposed parallel with the axis of the piston, and normal to the reciprocation of the sides, and pivotal connecting means between the pistons and the said slides such that the slides provide floating mountings in the piston actuating member for the outer ends of the pistons carried by the barrel and thrust means formed with the pistons, laterally at both sides thereof, to engage the sides of said slides during pressure cycle of the pistons and cylinders, substantially as specified.

2. In a hydraulic machine of the class described, in combination, a casing, a primary driving member comprising a cylinder barrel, a secondary driven piston actuating member, pistons carried by the primary driving member, and connecting means intermediate the barrel and the piston actuating member comprising radially movable slides on the barrel, together with slideways provided on the piston actuating member to receive said slides, the barrel having guide slots in which the said slides operate, connecting pins intermediate the pistons and said slides, and anti-friction bearings between the connecting pins and the slides, each slide comprising spaced sides in which the connecting pin of an adjacent piston is mounted, and each slide further comprising end members having journal portions mounted in the sides thereof.

3. In a radial piston pump or motor, a rotatable barrel having a radial cylinder, valve means therefor, a piston reciprocable therein, and having a head portion protruding outwardly beyond the outer end of the cylinder, a reactance rotor eccentric to the barrel and having spaced parallel walls disposed at opposite sides of the piston head portion, parallel chordal slideways in said walls, slide members received in said slideways for oscillation therealong, said members being spaced apart for receiving the head portion of the piston snugly therebetween, means connecting the members to the barrel for revolution therewith and concurrent radial movement relative thereto, thrust shoulders on opposite sides of the piston underlying the slide members respectively and in abutting relation thereto for transmitting load between the slide members and pistons, and means connecting the slide members and piston for movement together radially of the barrel.

4. In a radial piston pump or motor, a rotatable barrel having a radial cylinder, valve means for the cylinder, a piston reciprocable therein, and having a head portion protruding outwardly beyond the outer end of the cylinder, a reactance rotor eccentric to the barrel and having spaced parallel walls disposed at opposite sides of the piston, parallel chordal slideways in said walls, slide members received in said slideways for oscillation therealong, said members receiving the head portion of the piston, means connecting the members to the barrel for rotation therewith and concurrent radial movement relative thereto, thrust shoulders on opposite sides of the piston underlying the slide members respectively and in abutting relation thereto for transmitting load between the slide members and pistons, and a crosspin carried in said head portion and extending parallel to the axis of the barrel and having its end portions mounted in said slide members.

5. In a radial piston pump or motor, a rotatable barrel having a radial cylinder, valve means therefor, a piston reciprocable therein, and having a head portion protruding outwardly beyond the outer end of the cylinder, a reactance rotor eccentric to the barrel and having spaced parallel walls disposed at opposite sides of the piston, parallel chordal slideways in said walls, slide members received in said slideways for oscillation therealong, said members receiving the head portion of the piston, means connecting the members to the barrel for rotation therewith and concurrent radial movement relative thereto, thrust shoulders on opposite sides of the piston underlying the slide members respectively and in abutting relation thereto for transmitting load between the slide members and pistons, the surface of said shoulders exposed to the slide members being convex about an axis parallel to the barrel axis, and means connecting the slide members and piston for movement together radially of the barrel.

6. In a radial piston pump or motor, a rotatable barrel having a radial cylinder, valve means therefor, a piston reciprocable therein, a reactance rotor eccentric to the barrel and having spaced parallel walls positioned at opposite sides of the rotational path of the piston and extending parallel to said path, each side wall having a slideway, said slideways being parallel to each other, and extending unbrokenly fore and aft from in advance of rearwardly beyond the plane of the piston, slide members received in said slideways for oscillation therealong and receiving a portion of the piston therebetween, said slide members engaging the operating surfaces of said slideways at the plane of the piston, means connecting said members to the barrel for revolution therewith and concurrent radial movement relative thereto, whereby the barrel and reactance rotor are drivingly connected, a pin mounted at its ends in said slide members and extending parallel to the barrel axis and connected to the piston and means on the sides of the piston underlying the slide member for direct engagement therewith for transmitting load therebetween.

7. In a radial piston pump or motor, a rotatable barrel having a radial cylinder, valve means therefor, a piston reciprocable therein, a reactance rotor eccentric to the barrel and having spaced parallel side walls positioned at opposite sides of the rotational path of the piston and extending parallel to said path, each side wall having a chordal slideway, said slideways being parallel to each other, slide members received in said slideways for oscillation therealong and receiving a portion of the piston therebetween, slideways on the barrel extending parallel to the plane defined by the axes of the piston and barrel, cross members snugly received therein for oscillation parallel to the piston axis relative to the barrel, the ends of said cross members being journaled in said slide members, and means connecting the slide members and piston for radial reciprocation together.

8. In a radial piston pump or motor, a reactance rotor, a rotatable barrel having a radial cylinder and a flange in the plane of the cylinder, a piston in the cylinder having a head portion at its outer end, valve means for the cylinder, a radially extending guideway in said flange engaging the head portion of the piston at its leading and trailing faces in the direction of travel, parallel slideways in said flange in advance and in the rear of the piston head portion and parallel to said guideway, side frame members connected to the head portion of the piston and lying alongside the side faces of said flange, end frame members connecting the side frame members and snugly received in said slideways for oscillation parallel to the piston axis, and means connecting the side frame members to the reactance rotor and constraining the side frame members to oscillation tangentially of their path of revolution relative to the reactance rotor.

9. In a rotary, radial piston pump or motor, inner and outer eccentric rotors, piston and cylinder assemblies operatively interposed between the rotors, valve means for the assemblies, and torque transmitting means connecting the rotors for synchronous rotation, including a plurality of circumferentially spaced slideways in one rotor extending longitudinally of the path of rotation and spaced from the axis thereof, a plurality of radial slideways in the other rotor, slide members received in the first slideways respectively for oscillation therealong, transverse members connected to the slide members respectively and extending laterally therefrom and being received in said radial slideways respectively, said transverse members being arranged for limited rocking movement relative to the associated slide members about an axis parallel to the axis of rotation for rendering said members freely self-adjusting with respect to the associated slideways.

10. In a radial piston pump or motor, a rotatable barrel having radial cylinders, a portion of the barrel in which the cylinders are located being of greater width axially of the barrel than the diameter of the cylinders and terminating outwardly in a circumferentially continuous surface, and said cylinders terminating outwardly in said surface, valve means for the cylinders, pistons reciprocable in the cylinders respectively, an adjustable reactance rotor eccentric to the barrel and having spaced walls at opposite sides of the rotational path of the pistons, said walls having parallel slideways, rigid elements connected to the pistons, respectively, each of said elements comprising parallel side members received in said slideways for oscillation therealong and torque members connected thereto, a flange on the barrel extending radially outwardly beyond the circumferentially continuous surface of the said barrel portion, ways in the flange in advance and to the rear of each piston respectively and parallel to the plane defined by the axis of the associated piston and the axis of the barrel, and said flange ways receiving said torque members for reciprocation parallel to the axis of the associated piston for connecting the barrel and reactance rotor for synchronous rotation.

11. In a radial piston pump or motor, a rotatable barrel having a solid cylindrical portion, radial cylinders in said portion terminating at their outer ends at the outer radial limit of said solid portion and being less in diameter than the width of said portion, valve means for the cylinders, pistons reciprocable in the cylinders respectively, a reactance rotor eccentric to the barrel and having spaced walls disposed at opposite sides of the rotational path of pistons, parallel tangential slideways in said walls, slide means received in said slideways for oscillation therealong and connected to the pistons respectively for actuating the pistons, said barrel having a flange portion rigid therewith and extending radially outwardly beyond the outer radial limit of said solid cylindrical portion, said flange portion having guideways, two for each piston respectively, each guideway extending parallel to the axis of its associated piston, the two guideways associated with each piston being spaced from each other and each comprising two guiding surfaces spaced from each other substantially in the direction of rotation of said barrel, and torque-transmitting devices associated with said pistons and comprising means guided respectively by the two spaced guiding surfaces of each of the associated guideways and being connected to the slide means, thereby connecting the slide means to the cylinder barrel flange portion for concurrent rotation therewith and radial movement relative thereto for effecting synchronized rotation of the barrel and reactance rotor.

12. In a radial piston pump or motor, a rotatable barrel having a solid cylindrical portion, radial cylinders in said portion terminating at their outer ends at the outer radial limit of said solid portion, valve means for the cylinders, pistons reciprocable in the cylinders, said barrel having a radial flange portion rigid therewith and extending outwardly from the outer radial limit of said solid cylindrical portion, guideways in said flange portion and respective to the pistons, each guideway extending parallel to the associated piston axis, heads on the pistons guided for radial reciprocation in the guideways, a reactance rotor eccentric to the barrel and having spaced walls disposed at opposite sides of the rotational path of the pistons, parallel ways in said walls, thrust elements received in said ways for oscillation therealong and connected to the pistons respectively for actuating the pistons, said flange portion of the barrel having additional guideways associated with the pistons, said additional guideways being parallel to the axis of the associated piston, torque means connected to the thrust elements and guided in the associated additional guideways and connecting the elements to the barrel flange for concurrent rotation therewith and radial movement relative thereto for effecting synchronized rotation of the barrel and reactance rotor.

13. In a rotary radial piston pump or motor, a rotatable barrel member having radial cylinders, a portion of the barrel member in which the cylinders are located being of greater width axially of the barrel member than the diameter of the cylinders and terminating outwardly radially of the axis of rotation of the barrel member in a circumferentially continuous surface, whereby the cylinders are reinforced throughout their lengths and diameters, valve means associated with said cylinders, pistons reciprocable in the cylinders, an adjustable rotary reactance member operatively connected to the pistons, said barrel member having another portion rigid therewith and extending radially outwardly beyond said continuous surface substantially in the plane of rotation of the pistons and having radial guideways therein, said pistons having portions reciprocable in and guided by said guideways, additional ways in said last named portion of the barrel member, means operatively connected to the reactance member for oscillation relative thereto, and received in and guided by said additional ways for oscillation relative thereto, and providing a planetating connection between the combined members for connecting the members for synchronous rotation.

ELEK BENEDEK.